United States Patent [19]

Noguchi et al.

[11] Patent Number: 5,991,755
[45] Date of Patent: *Nov. 23, 1999

[54] DOCUMENT RETRIEVAL SYSTEM FOR RETRIEVING A NECESSARY DOCUMENT

[75] Inventors: Naohiko Noguchi, Yokohama; Masako Nomoto, Tokorozawa, both of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/755,929

[22] Filed: Nov. 25, 1996

[30] Foreign Application Priority Data

Nov. 29, 1995 [JP] Japan .................................. 7-332482

[51] Int. Cl.$^6$ ...................................................... G06F 17/30
[52] U.S. Cl. .................................. 707/3; 704/9; 707/531
[58] Field of Search .................................. 707/1, 2, 3, 4, 707/5, 6, 7, 8, 9, 10, 100, 200, 532; 345/440; 364/282.1, 282.3, 225.4

[56] References Cited

U.S. PATENT DOCUMENTS

| | | | |
|---|---|---|---|
| 5,062,074 | 10/1991 | Kleinberger | 707/5 |
| 5,293,552 | 3/1994 | Aalbersberg | 707/5 |
| 5,297,039 | 3/1994 | Kanaegami et al. | 707/5 |
| 5,488,725 | 1/1996 | Turtle et al. | 707/5 |
| 5,576,954 | 11/1996 | Driscoll | 707/3 |
| 5,619,709 | 4/1997 | Caid et al. | 707/532 |
| 5,625,767 | 4/1997 | Bartell et al. | 345/440 |
| 5,642,502 | 6/1997 | Driscoll | 707/5 |
| 5,835,087 | 11/1998 | Herz et al. | 345/327 |

OTHER PUBLICATIONS

Gerard Salton: *Introduction to Modern Information Retrieval*, Chap. 3,4. Mc–Graw–Hill, Inc: 1983.

*Primary Examiner*—Ruay Lian Ho
*Attorney, Agent, or Firm*—Lowe Hauptman Gopstein Gilman & Berner

[57] ABSTRACT

One or more important sentence structural functional units are extracted from an important portion of each of a plurality of documents, and one or more input sentence structural functional units are extracted from an input sentence. Each of the functional units is a noun phrase, a verb phrase, a pair of nouns connected each other through a preposition or the like. The important sentence structural functional units of each document are collated with the input sentence structural functional units to detect a matching degree, and a similarity level is determined from the matching degree for each document. Thereafter, occurrence frequencies of retrieval words existing in each documents are collated with occurrence frequencies of query words existing in the input sentence to determine an estimation value according to an estimation function for each document, the documents are ranked on condition that one or more documents of a high similarity level are ranked to a higher rank than one or more documents of a low similarity level and a plurality of documents of the same similarity level are ranked in the order of decreasing their estimation values. Accordingly, because the similarity level is determined for each document by considering the functional units, a user can retrieve one or more necessary documents with a high accuracy.

9 Claims, 8 Drawing Sheets

| THE NUMBER OF THE DOCUMENT | IMPORTANT GRADE | FUNCTIONAL UNIT |
|---|---|---|
| 1 | 1 | "ATHLETIC MEETING" |
| | 2 | "HOLD MEETING" |
| 2 | 2 | "HOLD MEETING" |
| 3 | 2 | "HOLD MEETING" |
| 5 | 1 | "ATHLETIC MEETING" |

FIRST DOCUMENT:

"THE FIRST NATIONAL ATHLETIC MEETING WAS HELD AT THE TOKYO SPORT CENTER ON MAY 15. IN THIS YEAR, THREE THOUSANDS ATHLETES TOOK PART IN THE MEETING FROM THE WHOLE NATION, AND THE ATHLETIC MEETING WAS THE GREATEST SCALE IN HISTORY.

SECOND DOCUMENT:

"AN ANNUAL GENERAL MEETING OF THE NATION ATHLETIC ASSOCIATION WAS HELD AT THE ORIENTAL HOTEL IN THE SHINAGAWA WARD OF TOKYO ON DECEMBER 10. THE NUMBER OF PARTICIPATORS IN THIS YEAR IS FIVE HUNDREDS, SO THAT 30% IS INCREASED AS COMPARED WITH THE NUMBER IN AN ORDINARY YEAR."

FIG. 3
PRIOR ART

| WORD | THE NUMBER OF THE DOCUMENT | OCCURRENCE FREQUENCY |
|---|---|---|
| HOLD | 1 | 1 |
| | 2 | 1 |
| NATIONAL | 1 | 1 |
| | 2 | 0 |
| ATHLETIC | 1 | 2 |
| | 2 | 1 |
| MEETING | 1 | 3 |
| | 2 | 1 |
| SPORT | 1 | 1 |
| | 2 | 0 |
| CENTER | 1 | 1 |
| | 2 | 0 |
| ⋮ | ⋮ | ⋮ |

FIG. 4
PRIOR ART

INPUT SENTENCE:

"ABOUT HOLDING THE ATHLETIC MEETING"

FIG. 5
PRIOR ART

| QUERY WORD | WEIGHTING FACTOR |
|---|---|
| HOLD | 1 |
| ATHLETIC | 1 |
| MEETING | 1 |

| WORD | THE NUMBER OF THE DOCUMENT | OCCURRENCE FREQUENCY |
|---|---|---|
| CHAIRMAN | 4 | 1 |
| FLOOD | 4 | 1 |
| HOLD | 1 | 1 |
|  | 2 | 1 |
|  | 3 | 2 |
|  | 5 | 1 |
| GUID | 4 | 1 |
| EDUCATION | 3 | 1 |
|  | 4 | 1 |
| TEACHER | 3 | 1 |
| ARGUMENT | 4 | 1 |
| WORK | 3 | 1 |
| RESEARCH | 3 | 1 |
| LOAD | 3 | 1 |
| SCHOOL | 3 | 1 |
|  | 5 | 1 |
| NATIONAL | 1 | 1 |
| YEAR | 1 | 1 |
|  | 2 | 1 |
| PRESCRIPTION | 4 | 1 |
| EDUCATION | 3 | 1 |
|  | 4 | 1 |
| EXAMPLE | 3 | 1 |
| INTRODUCE | 3 | 1 |
| FOCUS | 4 | 1 |
| SPORT | 1 | 1 |
| SLOGAN | 5 | 1 |
| YOUTHFUL | 5 | 1 |
| WHOLE | 1 | 1 |
|  | 3 | 1 |
|  | 4 | 2 |
| CENTER | 1 | 1 |
| SYNTHETIC | 5 | 1 |
| ATHLETIC | 1 | 2 |
|  | 2 | 1 |
|  | 3 | 3 |
|  | 4 | 2 |
|  | 5 | 1 |
| MEETING | 1 | 3 |
|  | 2 | 1 |
|  | 3 | 2 |
|  | 4 | 2 |
|  | 5 | 2 |

FIG. 8

| THE NUMBER OF THE DOCUMENT | FUNCTIONAL UNIT | THE NUMBER OF THE DOCUMENT | FUNCTIONAL UNIT |
|---|---|---|---|
| 1 | "NATIONAL ATHLETIC"<br>"ATHLETIC MEETING"<br>"NATIONAL MEETING"<br>"TOKYO SPORT"<br>"SPORT CENTER"<br>"TOKYO CENTER"<br>"HOLD MEETING"<br>"HOLD AT (A) CENTER"<br>"TAKE PART FROM NATION"<br>"SCALE IN HISTORY"<br>"GREATEST SCALE" | 4 | "JAPAN TEACHER ASSOCIATION"<br>"TEACHER ASSOCIATION"<br>"CALL MEETING"<br>"FOCUS ON AN ELECTION"<br>"ELECTION OF CHAIRMAN"<br>"CHAIRMAN OF COMMITTEE"<br>"PROBLEM IN EDUCATION"<br>"ATHLETIC EDUCATION"<br>"FLOOD OF PUNISHMENTS"<br>"PUNISHMENT IN NATION"<br>"PRESCRIPTION OF LINE"<br>"GUIDE LINE"<br>"LINE FOR COACHING"<br>"ATHLETIC COACHING"<br>"POINT OF ARGUMENT" |
| 2 | "ANNUAL MEETING"<br>"HOLD MEETING"<br>"NATIONAL ATHLETIC"<br>"ATHLETIC ASSOCIATION"<br>"NATIONAL ASSOCIATION"<br>"HOLD AT HOTEL"<br>"WARD OF TOKYO"<br>"NUMBER OF PARTICIPATORS"<br>"INCREASE 30%" | 5 | "SLOGAN OF MEETING"<br>"SYNTHETIC ATHLETIC MEETING"<br>"SYNTHETIC MEETING"<br>"ATHLETIC MEETING"<br>"BURN WITH ARDOR"<br>"HOLD MEETING"<br>"NAGANO CITY"<br>"CITY OF PREFECTURE"<br>"NAGANO PREFECTURE" |
| 3 | "RESEARCH MEETING"<br>"MEETING FOR TEACHER"<br>"ATHLETIC TEACHER"<br>"WORK IN SCHOOL"<br>"SCHOOL OF NATION"<br>"HOLD MEETING"<br>"INTRODUCE EXAMPLE"<br>"ATHLETIC COACHING"<br>"ATHLETIC COACHING EXAMPLE"<br>"COACHING EXAMPLE"<br>"TEACHING LOAD"<br>"DISCUSS PROBLEM"<br>"ATHLETIC EDUCATION"<br>"PROBLEM IN EDUCATION"<br>"PERFORM IN SCHOOL" | | |

FIG. 9 INPUT SENTENCE:

"ABOUT HOLDING THE ATHLETIC MEETING"

FIG. 10

| QUERY WORD | WEIGHTING FACTOR |
|---|---|
| HOLD | 1 |
| ATHLETIC | 1 |
| MEETING | 1 |

FIG. 11 INPUT FUNCTIONAL UNIT INFORMATION:

"ATHLETIC MEETING"
"HOLD MEETING"

FIG. 12 "ATHLETIC" AND "MEETING" AND "HOLD"

FIG. 13

| THE NUMBER OF THE DOCUMENT | FUNCTIONAL UNIT |
|---|---|
| 1 | "ATHLETIC MEETING" "HOLD MEETING" |
| 2 | "HOLD MEETING" |
| 3 | "HOLD MEETING" |
| 5 | "ATHLETIC MEETING" "HOLD MEETING" |

| IMPORTANT GRADE | FUNCTIONAL UNIT |
|---|---|
| 1 | "ATHLETIC MEETING" |
| 2 | "HOLD MEETING" |

FIG. 16

| THE NUMBER OF THE DOCUMENT | IMPORTANT GRADE | FUNCTIONAL UNIT |
|---|---|---|
| 1 | 1 | "ATHLETIC MEETING" |
| | 2 | "HOLD MEETING" |
| 2 | 2 | "HOLD MEETING" |
| 3 | 2 | "HOLD MEETING" |
| 5 | 1 | "ATHLETIC MEETING" |

DOCUMENT RETRIEVAL SYSTEM FOR RETRIEVING A NECESSARY DOCUMENT

BACKGROUND OF THE INVENTION

1. Field of the Invention

The present invention relates generally to a document retrieval system in which a desired document is retrieved from a data base in which pieces of electronic document information are stored, and more particularly to a document retrieval system in which a desired document is efficiently retrieved with high accuracy from a storing unit such as a document information data base, a general word processor or an office computer.

2. Description of the Related Art

A large number of pieces of electronic document information such as electronic mails, electronic catalogs, electronic publications and the like have been recently circulated, so that a document retrieval system in which a desired document is retrieved from a document information data base has been required.

In a conventional document retrieval system, a keyword search method for using a keyword manually attached to each of documents or a full-text search method for performing the collation of a plurality of character strings in a whole document with a reference character string with a high speed is generally used. In the full-text search method, any keyword attaching work manually performed is not required.

However, any of the above conventional methods is performed according to an exact match retrieval model in which the perfect agreement of query (or reference) information with superficial information such as a word, a character string or the like is required. That is, a user is required to prepare a retrieval formula (normally denoting a logical formula including a logical symbol "AND", "OR", "NOT" or the like) composed of a query character string as the query information. Therefore, unless the user is an expert for a document retrieval, it is difficult for the user to prepare an appropriate retrieval formula matching with a retrieval intention of the user. As a result, there is a case that all desired documents are not retrieved or a large number of unnecessary documents are undesirably retrieved, so that there is a drawback that a retrieval accuracy and a retrieval efficiency deteriorate together.

To avoid the above drawback, a large number of document retrieval methods according to an inexact match retrieval model have been proposed. In the inexact match retrieval model, a user specifies a natural language sentence or a typical sentence expressing a user's retrieval intention, so that the user is not required to prepare a logical formula. As a representative example of the inexact match retrieval model, a vector space model is well-known. In the vector space model, each of a plurality of documents and a query sentence is respectively expressed by a multi-dimensional characteristic vector, the similarity between the query sentence and each of the documents is measured by calculating a distance between the vector of the query sentence and the vector of a corresponding document, and the documents are ranked in order of similarity. A technique represented by the vector space model is disclosed in a literature "Salton, G. and McGill, M. J. :Introduction to Modern Information Retrieval, McGraw-Hill Publishing Company, 1983".

2.1. Previously Proposed Art

A document retrieval processing according to the conventional vector space model is described with reference to drawings.

Figure 1:
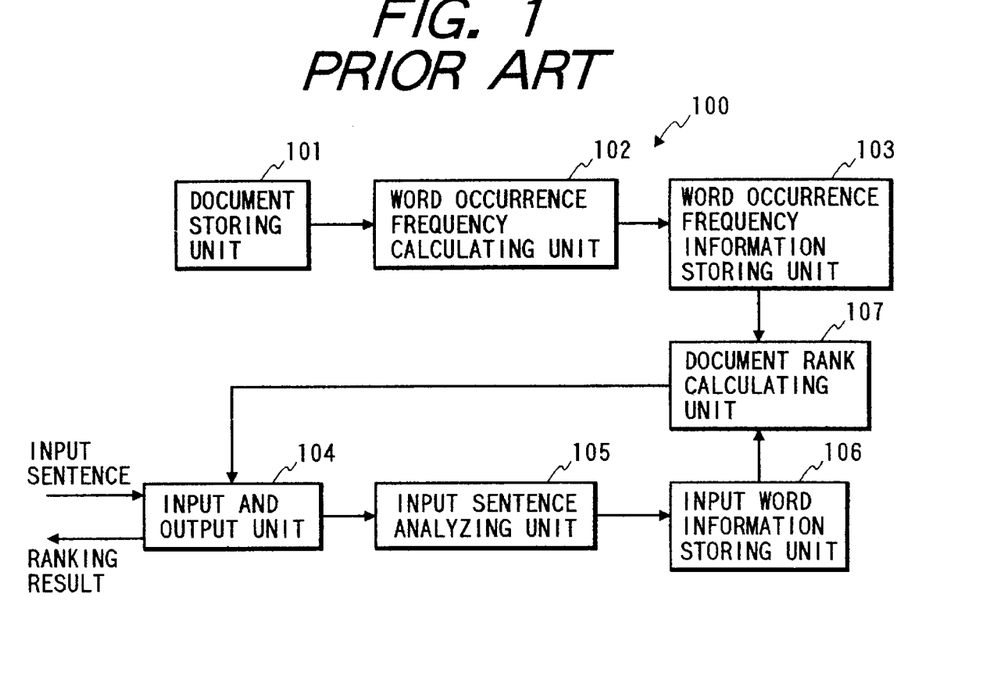
FIG. 1 is a block diagram of a conventional document retrieval system operated according to a conventional vector space model.

FIG. 1 is a block diagram of a conventional document retrieval system operated according to the conventional vector space model. As shown in FIG. 1, a conventional document retrieval system 100 is composed of a document storing unit 101 for storing a plurality of documents planned to be retrieved, a word occurrence frequency calculating unit 102 for reading out the documents from the document storing unit 101 and calculating an occurrence frequency of each of a plurality of words used in each of the documents, p1 a word occurrence frequency information storing unit 103 for storing the words and the occurrence frequencies calculated in the word occurrence frequency calculating unit 102 for each of the documents as word occurrence frequency information, an input and output unit 104 for receiving an input sentence from a user and outputting ranks of the documents to the user, an input sentence analyzing unit 105 for analyzing the input sentence received by the input and output unit 104 to extract a plurality of words from the input sentence as a plurality of query words used for retrieval and calculate an occurrence frequency of each of the query words and a weighting factor for each of the query words, an input word information storing unit 106 for temporarily storing the query words, the occurrence frequencies and the weighting factors obtained in the input sentence analyzing unit 105 as input word information, and a document rank calculating unit 107 for comparing and collating the word occurrence frequency information stored in the word occurrence frequency information storing unit 103 with the input word information stored in the input word information storing unit 106 to rank the documents in order of similarity to the input sentence and outputting a retrieval result indicating the ranks of the documents to the input and output unit 104.

In the above configuration, before a document retrieval is performed by a user, the documents stored in the document storing unit 101 are read out to the word occurrence frequency calculating unit 102, a morphological analysis is performed for each of the documents if necessary, each of the documents is divided into a plurality of retrieval words, an occurrence frequency of each of the retrieval words is measured for each of the documents, and the retrieval words and the occurrence frequencies are stored in the word occurrence frequency information storing unit 103 as word occurrence frequency information.

Figure 2:
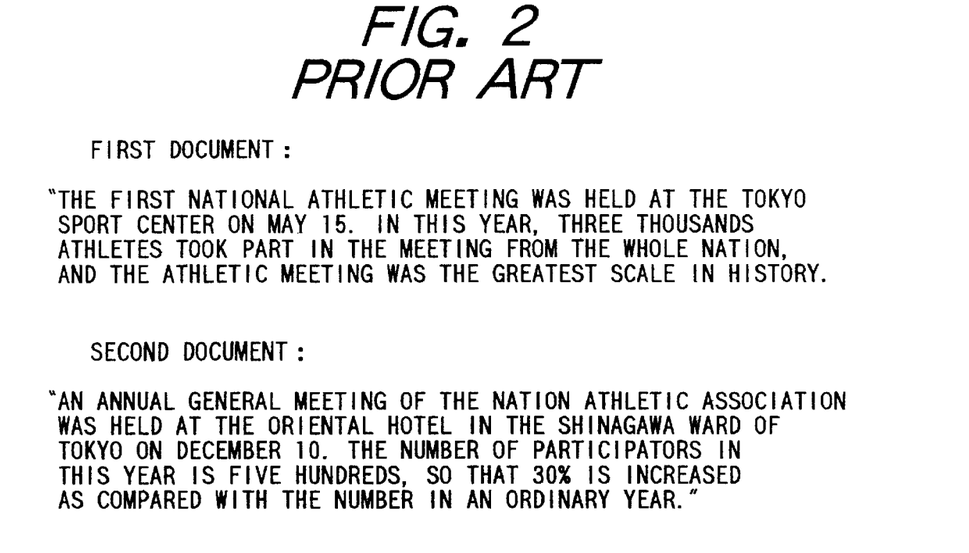
FIG. 2 shows, as an example, first and second documents stored in a document storing unit of the conventional document retrieval system.

An example of a document planned to be retrieved is shown in FIG. 2.

As shown in FIG. 2, a first document "The first National Athletic Meeting was held at the Tokyo sport center on May 15. In this year, three thousands athletes took part in the Meeting from the whole nation, and the athletic meeting was the greatest scale in history." is stored in the unit 101. Also, a second document "An annual general meeting of the Nation Athletic Association was held at the Oriental hotel in the Shinagawa ward of Tokyo on December 10. The number of participators in this year is five hundreds, so that 30% is increased as compared with the number in an ordinary year." is stored in the unit 101.

Figure 3:
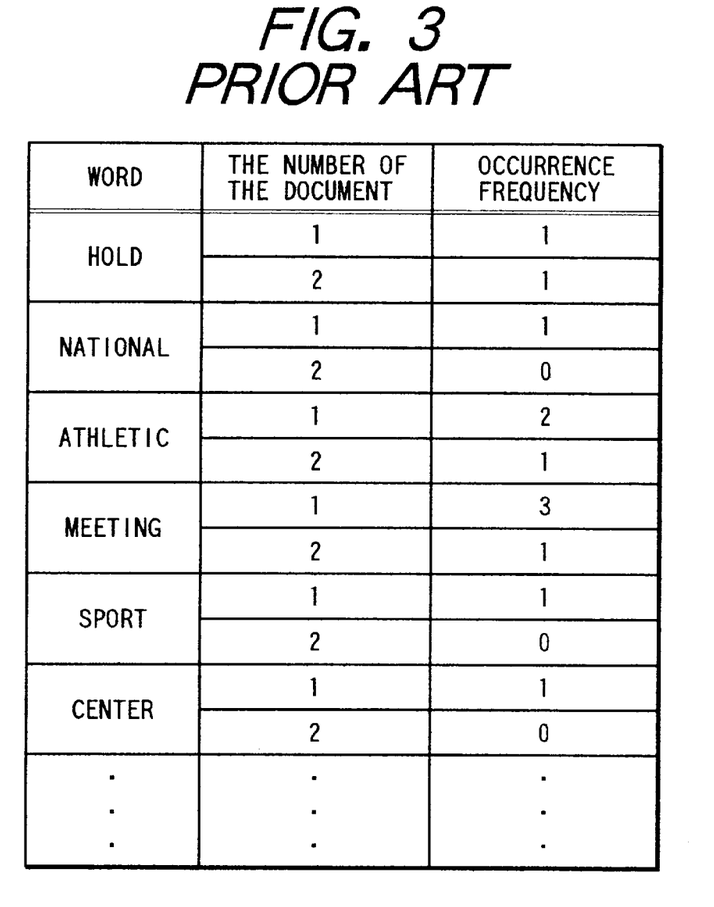
FIG. 3 shows an example of word occurrence frequency information obtained from the first and second documents.

An example of the word occurrence frequency information which are obtained from the first and second documents shown in FIG. 2 and is stored in the word occurrence frequency information storing unit 103 is shown in FIG. 3.

In this example, occurrence frequencies for the retrieval words "hold", "national", "athletic", "sport", "center", "meeting", "Tokyo" and the like are measured, and any word relating to an article, a preposition, an auxiliary verb or the like or "be", "is", "are", "was" or "were" is not measured for convenience. The word "held" of each document is measured as the retrieval word "hold".

Thereafter, when the user intends to perform a document retrieval, the user inputs a natural language sentence (or a query document) to the input and output unit 104 as an input sentence, and the input sentence is divided into a plurality of words in the input sentence analyzing unit 105. In this case, a morphological analysis is performed for the input sentence, if necessary. Therefore, the words are extracted from the input sentence as a plurality of query words, and a weighting factor indicating an important degree of one query word is calculated for each of the query words. In general, each of the weighting factors is determined according to an occurrence frequency of a corresponding query word in the input sentence or a value input by the user. Thereafter, the query words, the occurrence frequencies of the query words and the weighting factors for the query words are stored in the input word information storing unit 106 as input word information.

Figure 4:
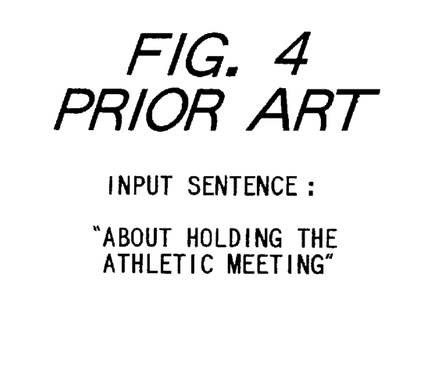
FIG. 4 shows an example of an input sentence expressing a user's retrieval intention.
Figure 5:
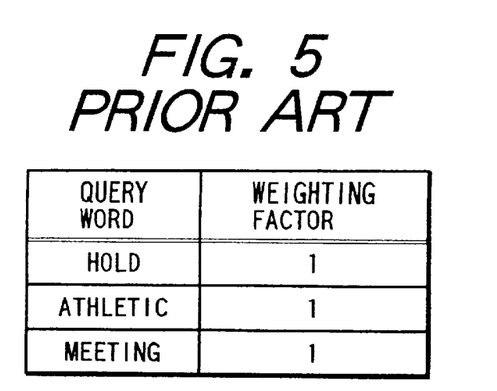
FIG. 5 shows an example of input word information obtained from the input sentence.

An example of the input sentence "about holding the Athletic meeting" is shown in FIG. 4. An example of the input word information analyzed in the input sentence analyzing unit 105 is shown in FIG. 5. In this case, the word "holding" is analyzed as a query word "hold", and an occurrence frequency of each query word is set as a weighting factor.

Thereafter, the word occurrence frequency information stored in the word occurrence frequency information storing unit 103 is compared and collated with the input word information stored in the input word information storing unit 106 in the document rank calculating unit 107, a weighting factor for each of the retrieval words is calculated, and the documents are ranked in order of similarity to the input sentence. For example, a weighting factor for each of the query words is often calculated according to a weighting calculating equation indicated by tf*idf. Each of the documents is expressed by a multi-dimensional characteristic vector calculated from the weighting factors for the retrieval words and the occurrence frequencies of the retrieval words. In the same manner, the input sentence is expressed by a multi-dimensional characteristic vector calculated from the weighting factors for the query words and the occurrence frequencies of the query words. Thereafter, a similarity between each of the documents and the input sentence is calculated from the multi-dimensional characteristic vector of the corresponding document and the multi-dimensional characteristic vector of the input sentence according to an estimation function. For example, an inner product of the two multi-dimensional characteristic vectors is calculated or an angle between the two multi-dimensional characteristic vectors is calculated as the estimation function.

In cases where a simple estimation function is used, a similarity S1 between the first document and the input sentence is calculated as follows.

S1=$\Sigma$ (weighting factor for one query word * occurrence frequency of one retrieval word agreeing with the query word)=1*2 (athletic)+1*3 (meeting)+1*1 (hold)=6

In the same manner, a similarity S2 between the second document and the input sentence is calculated as follows.

S=1*1 (athletic)+1*1 (meeting)+1*1 (hold)=3

Therefore, because the similarity S1 is higher than the similarity S2, a rank for the first document is higher than that for the second document.

Thereafter, a retrieval result indicating the ranks of the documents is output to the input and output unit 104.

Accordingly, in the conventional document retrieval system 100 operated according to the conventional vector space model, because the user is not required to convert a sentence expressing a user's retrieval intention to a retrieval formula, the user can easily use the conventional document retrieval system 100. Also, because a plurality of documents are ranked in order of similarity to the natural language sentence (or a query document) expressing the user's retrieval intention, one or more desired documents matching with the user's retrieval intention can be efficiently retrieved by referring the ranks of the documents output from the document retrieval system 100.

2.2. Problems to be Solved by the Invention

However, in the conventional document retrieval system 100 operated according to the conventional vector space model, because the documents and the input sentence expressing the user's retrieval intention are converted to the multi-dimensional characteristic vectors by using the occurrence frequencies and the weighting factors, there is a drawback that one or more documents matching with the user's retrieval intention can not be retrieved with a high accuracy.

In particular, because it is difficult to express an original meaning of a document or contents of a theme of a document by using a characteristic vector in the calculation of similarity, even though contents of a particular document greatly differs from those of a necessary document matching with the user's retrieval intention, an occurrence distribution of query words in the particular document is similar to that in the input sentence, the particular document is ranked to a high level, so that there is a drawback that a plurality of documents cannot be correctly ranked in order of similarity to the user's retrieval intention.

For example, when a third document "a research meeting for a plurality of athletic teachers working in a plurality of senior high schools of the whole nation is held on August 3. This meeting is held to introduce various athletic coaching examples in an actual teaching load and discuss various problems in the athletic education performed in each of the schools" is stored in the storing unit 101, a similarity S3 between the third document and the input sentence is calculated as follows.

S3=$\Sigma$ (weighting factor for one query word * occurrence frequency of a corresponding retrieval word)=1*3 (athletic)+1*2 (meeting)+1*2 (hold)=7

Therefore, because the similarity S3 is higher than the similarity S1 and the similarity S2, the third document is ranked to a higher level than those of the first and second documents. However, it is apparent that the contents of the first document match with the user's retrieval intention more than those of the third document.

SUMMARY OF THE INVENTION

An object of the present invention is to provide, with due consideration to the drawbacks of such a conventional document retrieval system, a document retrieval system in which a necessary document is retrieved with a high accuracy by ranking a plurality of documents including the necessary document while considering a theme of each of the documents.

The object is achieved by the provision of a document retrieval system, comprising:

word occurrence frequency calculating means for calculating an occurrence frequency of each of a plurality of retrieval words existing in each of a plurality of documents;

functional unit extracting means for extracting one or more document sentence structural functional units from each of the documents;

input sentence analyzing means for calculating an occurrence frequency of each of a plurality of query words existing in an input sentence and extracting one or more input sentence structural functional units from the input sentence;

functional unit collating means for collating the document sentence structural functional units of each document extracted by the functional unit extracting means with the input sentence structural functional units extracted by the input sentence analyzing means to calculate a matching degree of each document with the input sentence and classifying the documents into a plurality of similarity levels according to the matching degrees of the documents; and document rank determining means for calculating an estimation value of each of the documents from the occurrence frequencies of the retrieval words of the corresponding document calculated by the word occurrence frequency calculating means and the occurrence frequencies of the query words of the input sentence calculated by the input sentence analyzing means according to an estimation function and ranking each of the documents on condition that one or more documents classified into a high similarity level by the functional unit collating means are ranked to a higher level than one or more documents classified into a low similarity level by the functional unit collating means and a plurality of documents classified into the same similarity level are ranked in the order of decreasing their estimation values; and outputting means for outputting a document retrieval result indicating the ranks of the documents.

In the above configuration, one or more document sentence structural functional units are extracted from each of the documents by the functional unit extracting means. Each sentence structural functional unit is a noun phrase composed of a plurality of nouns arranged in series, a verb phrase composed of a verb and a case element which is formed of a noun or a combined phrase of a noun and a preposition connected with the verb in sentence structure, a pair of nouns connected to each other through a preposition, or the like. The case element in the verb phrase functions as an objective case, a place case or the like. Also, one or more input sentence structural functional units are extracted from the input sentence by the input sentence analyzing means in the same manner.

Thereafter, the document sentence structural functional units of each document are collated with the input sentence structural functional units by the functional unit collating means, a matching degree of each document with the input sentence is calculated, and the documents are classified into a plurality of similarity levels according to their matching degrees. For example, the matching degree denotes the number of types of document sentence structural functional units agreeing with input sentence structural functional units.

Also, occurrence frequencies of a plurality of retrieval words existing in each of the documents are calculated by the word occurrence frequency calculating means, occurrence frequencies of a plurality of query words existing in the input sentence are calculated by the input sentence analyzing means, and an estimation value of each of the documents is calculated from the occurrence frequencies of the retrieval words of the corresponding document and the occurrence frequencies of the query words of the input sentence according to an estimation function, and the documents are ranked according to their similarity levels and their estimation values by the document rank determining means. In this case, one or more documents classified into a high similarity level are ranked to a higher level than one or more documents classified into a low similarity level, and a plurality of documents classified into the same similarity level are ranked in the order of decreasing their estimation values.

Accordingly, because a document classified into a high similarity level is necessarily ranked to a higher level than a document classified into a low similarity level even though an estimation value of the document classified into the high similarity level is lower than that of the document classified into the low similarity level, the documents can be reliably ranked to reflect a user's retrieval intention expressed by the input sentence. Therefore, the user can retrieve a necessary document from the ranked documents with a high accuracy.

It is applicable that the functional unit extracting means comprise:

important portion extracting means for extracting an important portion expressing a theme of one document from each of the documents; and important functional unit extracting means for extracting one or more important sentence structural functional units from each of the important portions of the documents extracted by the important portion extracting means as the document sentence structural functional units.

In the above configuration, a tag indicating a document structure or a keyword indicating an important portion is included in each of the documents, and an important portion expressing a theme of one document is extracted from each of the documents by the important portion extracting means by detecting a tag or a keyword from each of the documents. Thereafter, one or more important sentence structural functional units are extracted from each of the important portions of the documents as the document sentence structural functional units by the important functional unit extracting means.

Therefore, the sentence structural functional units reflecting the user's retrieval intention can be reliably extracted from each document, the documents can be moreover correctly ranked, and a necessary document can be retrieved with a high accuracy.

Also, because the number of important sentence structural functional units extracted from each of the documents is reduced, the collation of the sentence structural functional units with the input sentence structural functional units can be efficiently performed by the functional unit collating means, so that the documents can be quickly ranked.

It is applicable that the input sentence structural functional units be classified into a plurality of important grades by the input sentence analyzing means, and the matching degree of each document with the input sentence be calculated according to the important grades by the functional unit collating means on condition that the matching degree is heightened as the number of input sentence structural functional units classified into one or more high important grades is increased.

In the above configuration, because the input sentence structural functional units are classified into a plurality of important grades, the documents can be ranked to moreover reflect the user's retrieval intention, and a necessary document can be retrieved with a high accuracy.

It is applicable that the document retrieval system further comprise:

retrieval formula generating means for generating a retrieval formula expressed by a logical combination of the query words of the input sentence; and retrieval document selecting means for examining whether or not each of the documents satisfies the retrieval formula generated by the retrieval formula generating means by searching the whole documents and selecting one or more particular documents satisfying the retrieval formula from the documents, particular document sentence structural functional units of each particular document selected from the document sentence structural functional units of each document being collated with the input sentence structural functional units by the functional unit collating means.

In the above configuration, document sentence structural functional units of each of all documents are not collated with the input sentence structural functional units, but particular document: sentence structural functional units of each particular document are collated with the input sentence structural functional units. Therefore, because one or more documents not satisfying the retrieval formula are removed from the collation performed by the functional unit collating means, the documents can be efficiently ranked, and a necessary document can be retrieved with a high accuracy.

BRIEF DESCRIPTION OF THE DRAWINGS

The objects, features and advantages of the present invention will be apparent from the following description taken in conjunction with the accompanying drawings, in which.

DETAILED DESCRIPTION OF THE EMBODIMENTS

Preferred embodiments of a document retrieval system according to the present invention are described with reference to drawings.

First Embodiment

Figure 6:
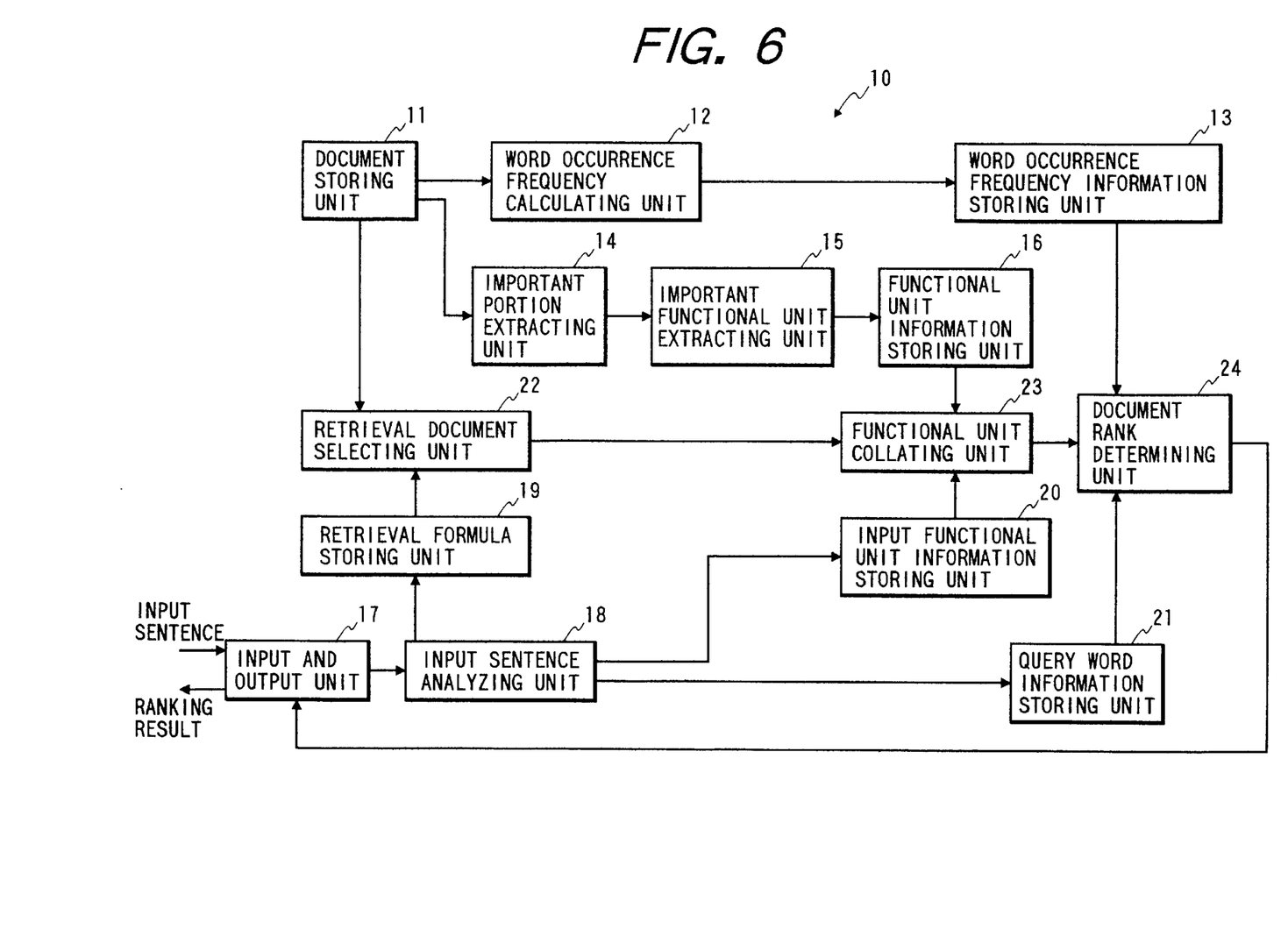
FIG. 6 is a block diagram of a document retrieval system according to a first embodiment of the present invention.

FIG. 6 is a block diagram of a document retrieval system according to a first embodiment of the present invention.

As shown in FIG. 6, a document retrieval system 10 comprises a document storing unit 11 for storing a plurality of documents planned to be retrieved, a tag indicating a document structure or a keyword indicating an important portion being included in each of the documents, a word occurrence frequency calculating unit 12 for reading out the documents from the document storing unit 11 and calculating an occurrence frequency of each of a plurality of words used in each of the documents, a word occurrence frequency information storing unit 13 for storing the words and the occurrence frequencies calculated in the word occurrence frequency calculating unit 12 for each of the documents as word occurrence frequency information, an important portion extracting unit 14 for reading out the documents from the document storing unit 11 and extracting an important portion expressing a theme of one document from each of the documents by detecting one tag or one keyword from each of the documents, an important functional unit extracting unit 15 for extracting one or more important sentence structural functional units from each of the important portions extracted in the important portion extracting unit 14, a functional unit information storing unit 16 for storing the important sentence structural functional units extracted in the important functional unit extracting unit 15 as important functional unit information for each document, an input and output unit 17 for receiving an input sentence from a user and outputting a retrieval result indicating ranks of the documents stored in the document storing unit 11 to the user, an input sentence analyzing unit 18 for analyzing the input sentence received by the input and output unit 17, extracting a plurality of query words used for retrieval and one or more input sentence structural functional units from the input sentence, calculating an occurrence frequency of each of the query words and making a retrieval formula expressed by a logical combination of a plurality of query words extracted from the input sentence, a retrieval formula storing unit 19 for storing the retrieval formula made in the input sentence analyzing unit 18, an input functional unit information storing unit 20 for storing the input sentence structural functional units extracted in the input sentence analyzing unit 18 as input functional unit information, a query word information storing unit 21 for storing the query words extracted in the input sentence analyzing unit 18 as query word information;

a retrieval document selecting unit 22 for examining whether or not each of the documents stored in the document storing unit 11 satisfies a retrieval condition indicated by the retrieval formula stored in the retrieval formula storing unit 19 by searching the whole documents and selecting one or more particular documents satisfying the retrieval condition indicated by the retrieval formula from the documents, a functional unit collating unit 23 for selecting the important functional unit information of each particular document selected in the retrieval document selecting unit 22 from the functional unit information stored in the functional unit information storing unit 16, comparing and collating the important functional unit information of each particular document with the input functional unit information of the input sentence stored in the input functional unit information storing unit 20 to detect a matching degree of the important functional unit information of each particular document with the input functional unit information of the input sentence and classifying the particular documents into a plurality of similarity levels according to the matching degrees, and a document rank determining unit 24 for selecting the word occurrence frequency information of each particular document selected in the retrieval document selecting unit 22 from the word occurrence frequency information stored in the word occurrence frequency information storing unit 13, comparing and collating the word occurrence frequency information of each particular document with the query word information stored in the query word information storing unit 21 to rank one or more particular documents of each similarity level classified in the functional unit collating unit 23 in order of similarity to the input sentence and outputting a retrieval result indicating the ranks of the particular documents to the input and output unit 17.

In the above configuration, an operation in the document retrieval system 10 is described. The documents stored in the document storing unit 11 are read out one after another to the word occurrence frequency calculating unit 12, a morphological analysis is performed for each of the documents if necessary, each of the documents is divided into a plurality of retrieval words, an occurrence frequency of each of the retrieval words is measured for each of the documents, and the retrieval words and the occurrence frequencies are stored in the word occurrence frequency information storing unit 13 as word occurrence frequency information for each of the documents.

Also, the documents stored in the document storing unit 11 are read out one after another to the important portion extracting unit 14, an important portion expressing a theme of one document is extracted from each of the documents by detecting a tag or a keyword from each of the documents. In each of the documents, one tag indicating a document structure or one keyword indicating an important portion is included. Thereafter, one or more sentence structural functional units are extracted from each of the important portions in the important functional unit extracting unit 15, and the sentence structural functional units are stored in the functional unit information storing unit 16 as important functional unit information for each of the documents. Each sentence structural functional unit is a noun phrase composed of a plurality of nouns arranged in series, a verb phrase composed of a verb and a case element which is formed of a noun or a combined phrase of a noun and a preposition connected with the verb in sentence structure, a pair of nouns connected to each other through a preposition, or the like. The case element in the verb phrase functions as an objective case, a place case or the like. For example, a verb phrase "hold an athletic meeting" is composed of a verb "hold" and a case element "athletic meeting" functioning as an objective case, and another verb phrase "go to Tokyo" is composed of a verb "go" and a case element "to Tokyo" functioning as a place case.

A case that five documents are stored in the document storing unit 11 is assumed as an example.

An important portion of a first document is the description "The first National Athletic Meeting was held at the Tokyo sport center on May 15. In this year, three thousands athletes took part in the Meeting from the whole nation, and the athletic meeting was the greatest scale in history.". An important portion of a second document is the description "An annual general meeting was held by the Nation Athletic Association at the Oriental hotel in the Shinagawa ward of Tokyo on December 10. The number of participators in this year is five hundreds, so that 30% is increased as compared with the number in an ordinary year.". An important portion of a third document is the description "A research meeting for a plurality of athletic teachers working in a plurality of senior high schools of the whole nation is held on August 3. This meeting is held to introduce various athletic coaching examples in an actual teaching load and discuss various problems in the athletic education performed in each of the schools.". An important portion of a fourth document is the description "The Japan Teacher Association calls a whole nation representative meeting on March 20. This meeting focuses on an election of a next chairman of a committee. However, because there are problems in the athletic education such as a flood of physical punishments in the whole nation, the prescription of a guide line for the athletic coaching is a point of the argument.". An important portion of a fifth document is the description "A slogan of the thirtieth senior high school synthetic athletic meeting is "Let's burn with youthful ardor". At this time, the meeting is held for ten days from October 10 to October 19 around the Nagano city of the Nagano prefecture.".

Figure 7:
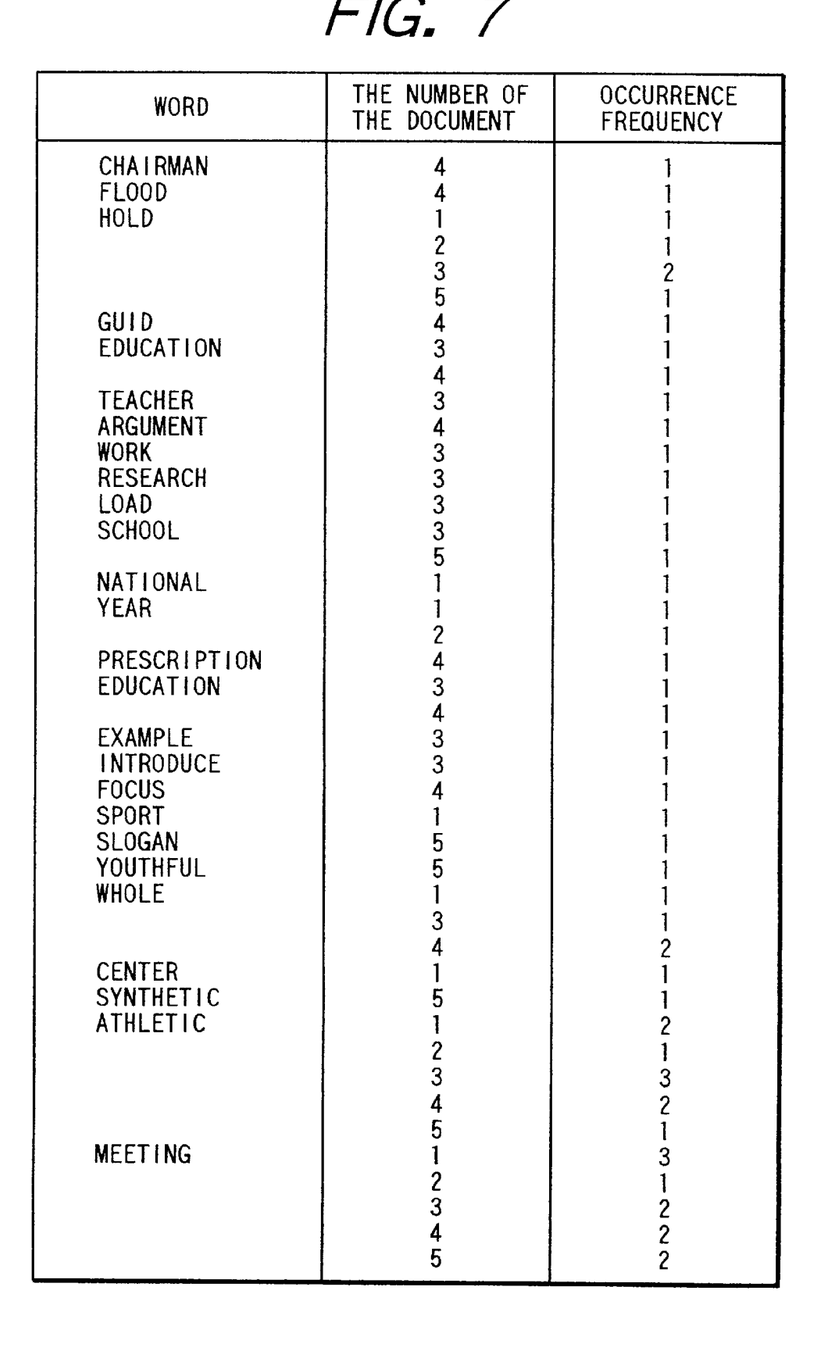
FIG. 7 shows an example of word occurrence frequency information stored in a word occurrence frequency information storing unit of the document retrieval system according to the first embodiment.
Figure 8:
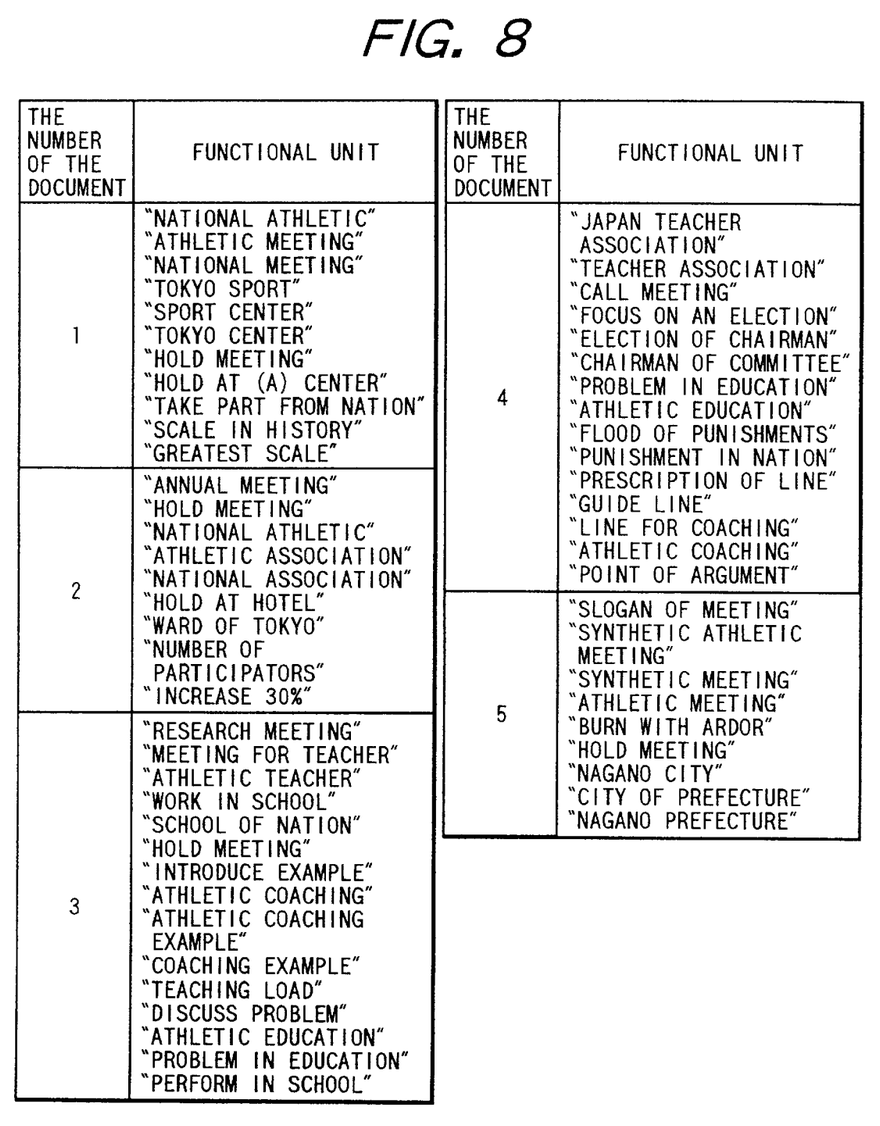
FIG. 8 shows an example of functional unit information stored in a functional unit information storing unit of the document retrieval system according to the first embodiment.

In this case, an example of the word occurrence frequency information stored in the word occurrence frequency information storing unit 13 is shown in FIG. 7. Also, an example of the functional unit information stored in the functional unit information storing unit 16 is shown in FIG. 8.

Thereafter, when a user desires to search one or more particular documents stored in the document storing unit 11, a natural language sentence is input to the input and output unit 17 as an input sentence to specify the particular documents. Thereafter, the input sentence is analyzed in the input analyzing unit 18. That is, a morphological analysis is performed for the input sentence if necessary, the input sentence is divided into a plurality of words to obtain a plurality of query words, and an occurrence frequency of each query word is measured. Also, one or more input sentence structural functional units are extracted from the input sentence in the input analyzing unit 18 in the same manner in the important functional unit extracting unit 15. Also, a retrieval formula expressed by a logical combination of a plurality of query words extracted from the input sentence is automatically made in the input analyzing unit 18. Thereafter, the query words and the occurrence frequencies of the query words are stored in the query word information storing unit 21 as query word information, the input sentence structural functional units are stored in the input functional unit information storing unit 20 as input functional unit information, and the retrieval formula is stored in the retrieval formula storing unit 19.

Figure 9:
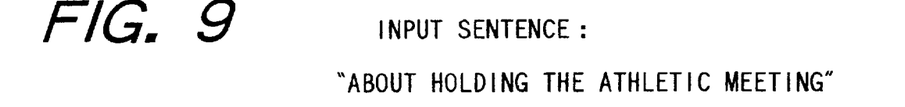
FIG. 9 shows an example of an input sentence expressing a user's retrieval intention.
Figure 10:
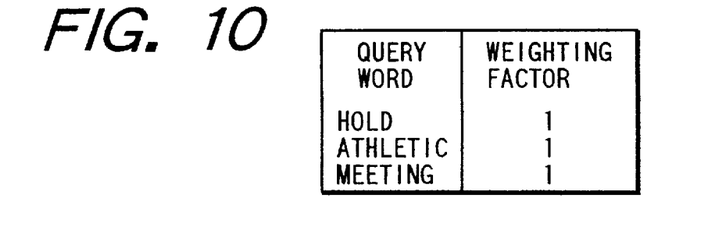
FIG. 10 shows an example of query word information stored in a query word information storing unit of the document retrieval system according to the first embodiment.
Figure 11:
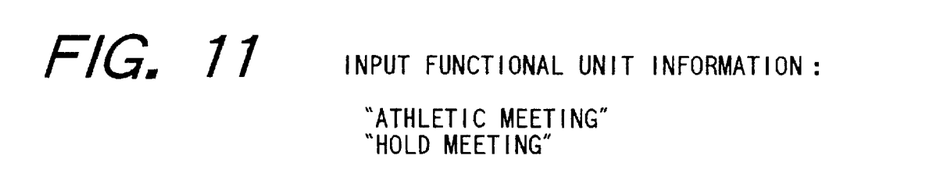
FIG. 11 shows an example of input functional unit information stored in an input functional unit information storing unit of the document retrieval system according to the first embodiment.
Figure 12:
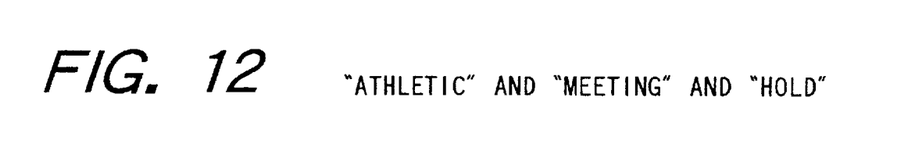
FIG. 12 shows an example of a retrieval formula stored in a retrieval formula storing unit of the document retrieval system according to the first embodiment.

An example "about holding the Athletic meeting" of the input sentence is shown in FIG. 9, an example of the query word information is shown in FIG. 10, an example of the input functional unit information is shown in FIG. 11, and an example of the retrieval formula is shown in FIG. 12. A first input sentence structural functional unit in the input functional unit information is a noun phrase "athletic meeting", and a second input sentence structural functional unit in the input functional unit information is a verb phrase "hold (a) meeting". Because the query words "athletic", "meeting" and "holding" are included in the input sentence, the retrieval formula "athletic" AND "meeting" AND "hold" is determined. In this case, the words "holding" and "held" are included in the word "hold".

Thereafter, whether or not each of the documents stored in the document storing unit 11 satisfies a retrieval condition indicated by the retrieval formula stored in the retrieval formula storing unit 19 is examined in the retrieval document selecting unit 22 by searching all sentences of each document, and one or more particular documents satisfying the retrieval condition indicated by the retrieval formula are selected from the documents. Because the words "athletic", "meeting" and "holding" exist in the important portions of the first, second, third and fifth documents, each of the first, second, third and fifth documents satisfies a retrieval condition indicated by the retrieval formula and is selected as one particular document. In contrast, because the word "hold" does not exist in the important portion of the fourth document, the fourth document is not selected as one particular document. Therefore, a particular document signal Sd={1,2,3,5} is transmitted to the functional unit collating unit 23 and the document rank determining unit 24.

In the unit 23, the important functional unit information of each particular document read out from the functional unit information storing unit 16 is compared and collated with the input functional unit information read out from the input functional unit information storing unit 20. That is, it is examined whether or not each of the input functional units in the input functional unit information exists in the important portion of each particular document, a matching degree which indicates the number of types of important sentence structural functional units of one important portion of one particular document agreeing with input sentence structural functional units of the input functional unit information is calculated for each of the particular documents, and the particular documents are classified into a plurality of similarity levels according to the matching degrees.

Figure 13:
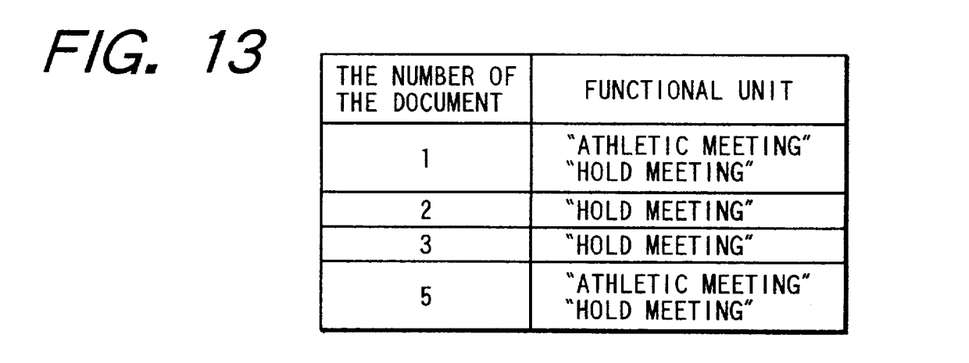
FIG. 13 shows an example of a collating result, which indicates one or more input sentence structural functional units existing in each of important portions of documents, in a functional unit collating unit of the document retrieval system according to the first embodiment.

For example, as shown in FIG. 13, the first input sentence structural functional unit "athletic meeting" exists in the important portions of the first and fifth documents, and the second input sentence structural functional unit "hold meeting" exists in the important portions of the first, second, third and fifth documents. Therefore, the first and fifth documents are classified as the upper similarity level, and the second and third documents are classified as the lower similarity level.

Thereafter, a similarity level signal indicating the similarity levels of the particular documents are transmitted to the document rank determining unit 24. In the unit 24, the word occurrence frequency information of each particular document is read out from the word occurrence frequency information storing unit 13 according to the particular document signal, the word occurrence frequency information of each of the particular documents classified to the same similarity level is compared and collated with the query word information stored in the query word information storing unit 21, the particular documents of the similarity levels classified in the functional unit collating unit 23 are ranked according to an estimation function E(D) in order of similarity to the input sentence, and a retrieval result indicating the ranks of the particular documents is output to the input and output unit 17.

The estimation function E(D) is, for example, formulated as follows.

$E(D) = \Sigma$ (a weighting factor for one query word * an occurrence frequency of one retrieval word agreeing with the query word)

Estimation values for the particular documents classified as the upper similarity level are respectively calculated as follows by calculating an occurrence frequency of the retrieval word agreeing with each query word.

$E(1) = 1*2$ (athletic)+$1*3$ (meeting)+$1*1$ (hold)=6
$E(5) = 1*1$ (athletic)+$1*2$ (meeting)+$1*1$ (hold)=4

In this calculation, the weighting factor for each query word is set to 1 because the occurrence frequency for each query word is 1, and the occurrence frequencies of the retrieval words existing in each of the important portions of the particular documents are used to simplify the explanation of this embodiment. In a real document retrieval operation, occurrence frequencies for all sentences of each particular document are calculated.

Because the estimation value for the first document is higher than that for the fifth document, the first document is ranked to be higher than the rank of the fifth document. Also, estimation values for the particular documents classified as the lower similarity level are calculated as follows.

$E(2) = 1*1$ (athletic)+$1*1$ (meeting)+$1*1$ (hold)=3
$E(3) = 1*3$ (athletic)+$1*2$ (meeting)+$1*2$ (hold)=7

Because the estimation value for the third document is higher than that for the second document, the third document is ranked to be higher than the rank of the second document. In this case, because the first and fifth documents are set to the upper similarity levels, the first and fifth documents are ranked to be higher than the second and third documents regardless of the estimation values of the particular documents. Therefore, the first document is set to a first rank, the fifth document is set to a second rank, the third document is set to a third rank and the second document is set to a fourth rank.

Thereafter, the user retrieves one or more desired documents such as the first document and the fifth document by referring the ranks of the documents output from the input and output unit 17.

Accordingly, assuming that any particular document is not selected from a plurality of documents stored in the document storing unit 11 in the same manner as in the prior art, even though it is apparent that the fourth document is not desired by the user because the word "hold" does not exist in the important portion of the fourth document, the calculation of the estimation value for the fourth document is undesirably required. However, in this embodiment, because it is examined whether or not each of the documents satisfies the retrieval condition of the retrieval formula automatically made from the input sentence in the input analyzing unit 18 and any calculation of the estimation value for one or more documents not satisfying the retrieval condition of the retrieval formula is not performed, a document retrieval operation can be efficiently and correctly performed.

Also, assuming that a group of one or more functional units is not extracted from an only important portion of each document stored in the document storing unit 11 but a group of one or more functional units is extracted from all sentences of each document, one or more functional units extracted from an insignificant portion of each document are also collated with one or more functional units extracted from the input sentence in the functional unit collating unit 23. Therefore, even though a document does not reflect a user's retrieval intention expressed by the input sentence so much, there is a probability that the document is undesirably ranked to an upper similarity level. Also, because the number of functional units extracted from each document is enormously increased, there is a drawback that a calculation volume for collating the functional units with the input functional units is enormously increased. However, in this embodiment, because one or more functional units are extracted from an only important portion of each document in the extracting units 14 and 15, there is no probability that a document not reflecting the user's retrieval intention so much is ranked to an upper similarity level. Accordingly, a plurality of documents desired by the user can be ranked in the order of reflecting the user's retrieval intention with a high accuracy.

Also, assuming that a similarity level of each particular document is not determined in the same manner as in the prior art, the third, first, fifth and second documents are ranked in that order. Because it is apparent that the first and fifth documents matches with a user's retrieval intention expressed by the input sentence more than the second and third embodiments, the ranking order for the first, second, third and fifth documents determined is wrong. However, in this embodiment, because an important portion of each documents is extracted to extract one or more important functional units from the important portion of each particular document and a similarity level is determined for each particular document by collating the important functional units of each particular document with one or more input functional units of the input sentence in the functional unit collating unit 23, the first and fifth documents apparently matching with the user's retrieval intention can be classified as the upper similarity level, and the first and fifth documents can be ranked to be higher than the ranks of the second and third documents. Accordingly, a plurality of documents can be ranked in the order of reflecting the user's retrieval intention with a high accuracy, and the user can efficiently retrieve one or more necessary documents from the ranked documents with a high accuracy.

Second Embodiment

In cases where the description "An athlete convention is held in the Nagano city of the Nagano prefecture on October 10, and a slogan in the thirtieth senior high school synthetic athletic meeting is determined to "Let's burn with youthful ardor." is stored in the document storing unit 11 as an important portion of the fifth document, because the second input sentence structural functional unit "hold meeting" does not exist in the important portion of the fifth document, the first document is classified as the upper similarity level, and the second, third and fifth documents are classified as the lower similarity level. In this case, an estimation value for the fifth document is calculated in the document rank determining unit 24 as follows.

E(5)=1*1 (athletic)+1*1 (meeting)+1*1 (hold)=3

Therefore, because the estimation value for the fifth document is lower than that for the third document and is equal to that for the second document, the first document is set to the first rank, the third document is set to the second rank, and the second and fifth documents are set to the same third rank. However, it is apparent that the fifth document matches with the user's retrieval intention more than the second and third documents, and a retrieval result for the documents does not correctly reflect the user's retrieval intention expressed by the input sentence. This drawback is solved in a second embodiment.

Figure 14:
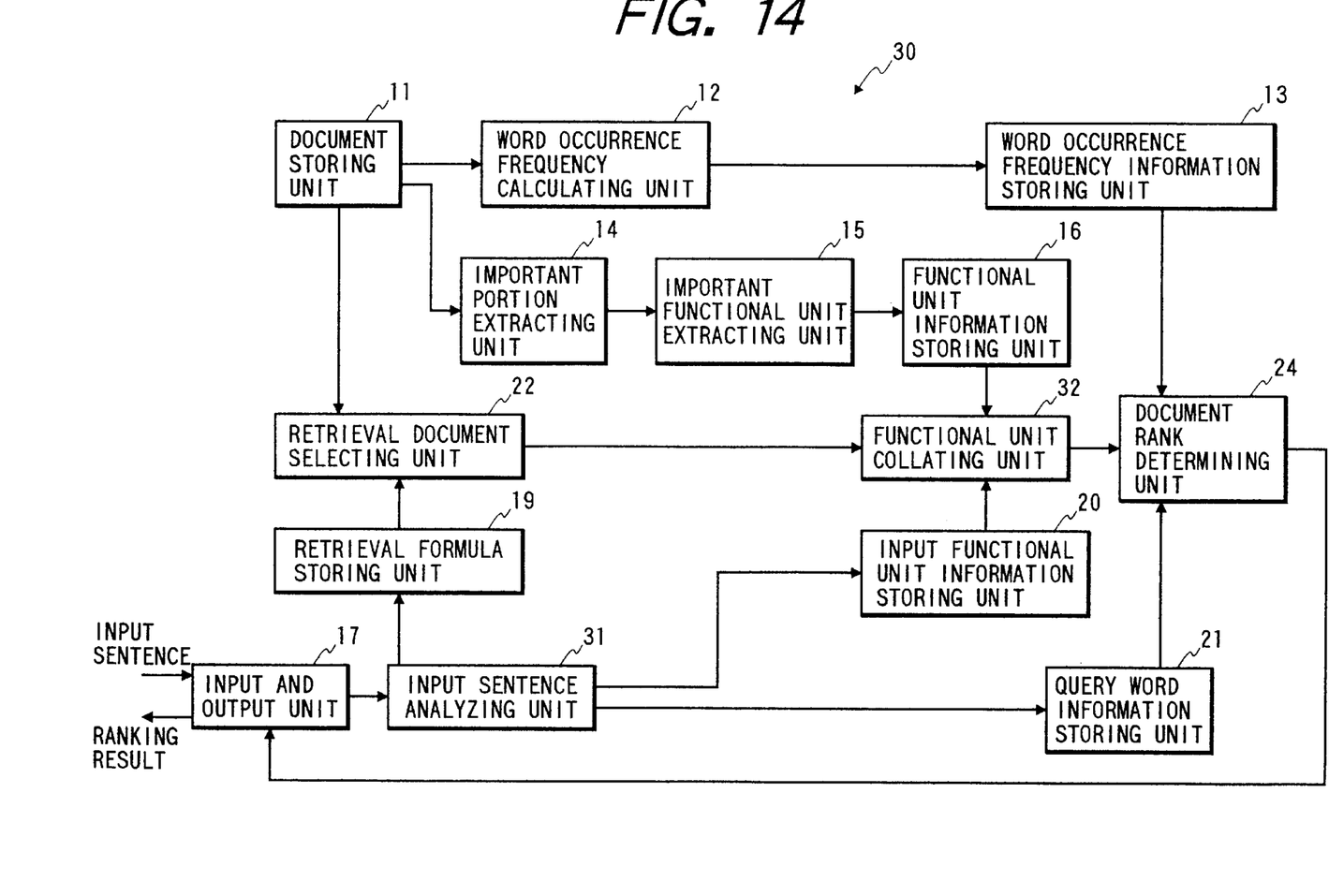
FIG. 14 is a block diagram of a document retrieval system according to a second embodiment of the present invention.

FIG. 14 is a block diagram of a document retrieval system according to a second embodiment of the present invention.

As shown in FIG. 14, a document retrieval system 30 comprises the document storing unit 11, the word occurrence frequency calculating unit 12, the word occurrence frequency information storing unit 13, the important portion extracting unit 14, the important functional unit extracting unit 15, the functional unit information storing unit 16, the input and output unit 17, an input sentence analyzing unit 31 for analyzing the input sentence received by the input and output unit 17, extracting a plurality of query words used for retrieval and one or more input sentence structural functional units from the input sentence, classifying the input sentence structural functional units into a plurality of important grades, calculating an occurrence frequency of each of the query words and making a retrieval formula from the input sentence, the retrieval formula storing unit 19, the input functional unit information storing unit 20, the query word information storing unit 21, the retrieval document selecting unit 22, a functional unit collating unit 32 for selecting the important functional unit information of each particular document selected in the retrieval document selecting unit 22 from the functional unit information stored in the functional unit information storing unit 16, comparing and collating the important functional unit information of each particular document with the input functional unit information of the input sentence stored in the input functional unit information storing unit 20 to detect a matching degree of the important functional unit information of each particular document with the input functional unit information of the input sentence and classifying the particular documents into a plurality of similarity levels according to the matching degrees and the important grades, and the document rank determining unit 24.

Figure 15:
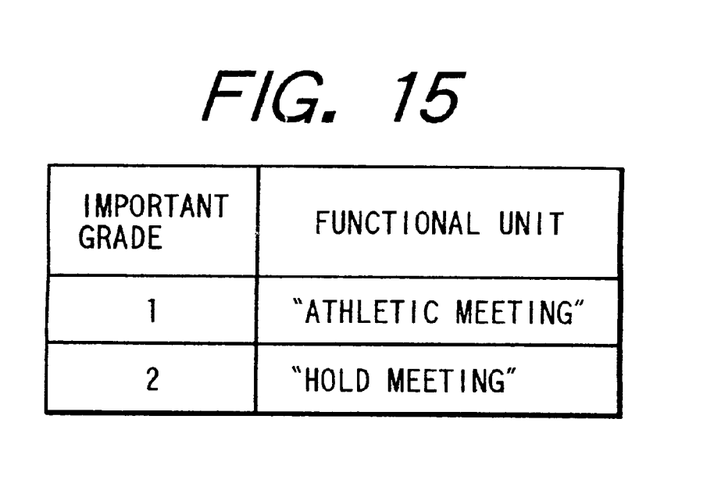
FIG. 15 shows an example of input sentence structural functional units classified into a plurality of important grades.

In the above configuration, the input sentence structural functional units are classified into a plurality of important grades in the input sentence analyzing unit 31. For example, a noun phrase in the input sentence structural functional units is set to a higher important grade than a verb phrase in the input sentence structural functional units. In this case, as shown in FIG. 15, because the first input sentence structural functional unit "athletic meeting" is set to a high important grade, and the second input sentence structural functional unit "hold meeting" is set to a low important grade.

Figure 16:
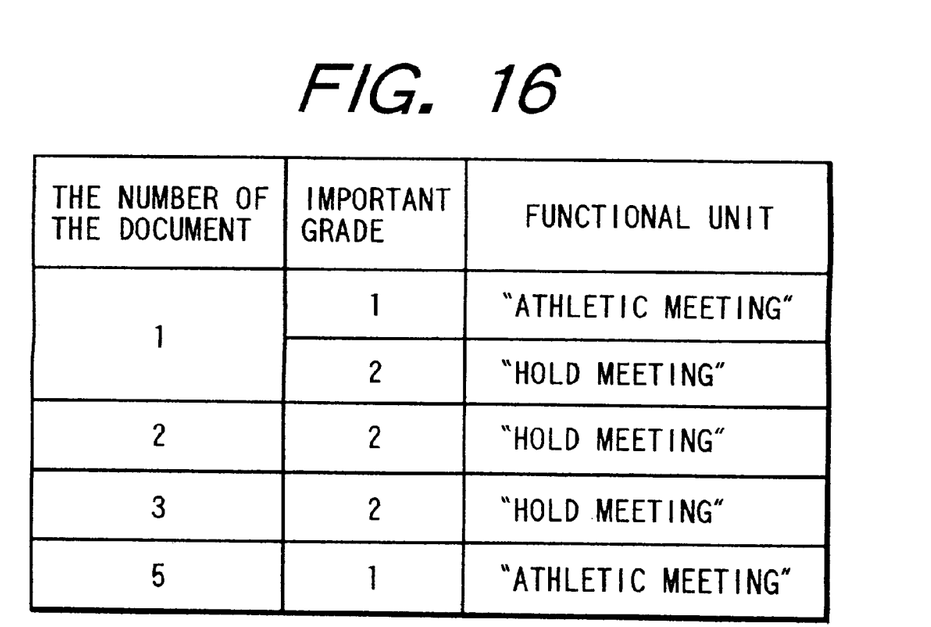
FIG. 16 shows an example of a collating result, which indicates one or more input sentence structural functional units existing in each of important portions of documents, in a functional unit collating unit of the document retrieval system according to the second embodiment.

Thereafter, the important functional unit information of each particular document is compared and collated with the input functional unit information of the input sentence in the functional unit collating unit 32. In this case, as shown in FIG. 16, the first input sentence structural functional unit "athletic meeting" set to the high important grade exists in the important portion of the fifth document, the second input sentence structural functional unit "hold meeting" set to the low important grade does not exist in the important portion of the fifth document, the second input sentence structural functional unit "hold meeting" set to the low important grade exists in each of the important portions of the second and third documents, and the first input sentence structural functional unit "athletic meeting" set to the high important grade does not exist in each of the important portions of the second and third documents. Therefore, the first document is set to the first similarity level, the fifth document is set to the second similarity level, and the second and third documents are set to the third similarity level.

Therefore, when the particular documents are ranked in the document rank determining unit 24, the first document is set to the first rank, the fifth document is set to the second rank, the third document is set to the third rank and the second document is set to the fourth rank.

Accordingly, because the input sentence structural functional units are classified into a plurality of important grades in the input analyzing unit 31 and a plurality of particular documents are classified into a plurality of similarity levels in the functional unit collating unit 32 even though the matching degrees (or the number of types of important functional units agreeing with input functional units) for the particular documents are the same as each other, even though an estimation value for a document matching with a user's retrieval intention is lower than that for another document not matching with the user's retrieval intention, the document matching with the user's retrieval intention can be ranked to a higher level than that of the document not matching with the user's retrieval intention. Therefore, a plurality of documents desired by the user can be correctly ranked in the order of reflecting the user's retrieval intention.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A document retrieval system, comprising:
   word occurrence frequency calculating means for calculating an occurrence frequency of each of a plurality of retrieval words existing in each of a plurality of documents;
   functional unit extracting means for extracting one or more document sentence structural functional units from each of the documents, each document sentence structural functional unit being composed of a plurality of words;
   input sentence analyzing means for extracting a plurality of query words from an input sentence and extracting one or more input sentence structural functional units from the input sentence, each input sentence structural functional unit being composed of a plurality of query words;
   functional unit collating means for collating the document sentence structural functional units of each document extracted by the functional unit extracting means with the input sentence structural functional units extracted by the input sentence analyzing means, selecting one or more particular documents, in which a particular document sentence structural functional unit agreeing with one input sentence structural functional unit exists, from the documents, calculating a matching degree, which indicates the number of particular document sentence structural functional units respectively agreeing with one input sentence structural functional unit, for each particular document and classifying the particular documents into a plurality of similarity levels according to the matching degrees of the documents, each particular document being classified into a higher similarity level as the matching degree of the particular document becomes higher;
   document rank determining means for collating each retrieval word of one particular document with the query words of the input sentence for each particular document selected by the functional unit collating means extracting one or more particular retrieval words respectively agreeing with one query word of the input sentence for each particular document, calculating an estimation value of one particular document according to the occurrence frequencies of the particular retrieval words of the particular document calculated by the word occurrence frequency calculating means for each particular document and ranking each of the particular documents according to the similarity levels of the particular documents set by the functional unit collating means and the estimation values of the particular documents on condition that one or more particular documents classified into a first similarity level are set to a rank higher than that of one or more particular documents classified into a second similarity level lower than the first similarity level and one or more particular documents classified into the same similarity level are ranked in the order of decreasing their estimation values; and
   outputting means for outputting a document retrieval result indicating the ranks of the particular documents.

2. A document retrieval system according to claim 1 in which the functional unit extracting means comprises:
   important portion extracting means for extracting an important portion expressing a theme of one document from each of the documents; and
   important functional unit extracting means for extracting one or more important sentence structural functional units from each of the important portions of the documents extracted by the important portion extracting means as the document sentence structural functional units.

3. A document retrieval system according to claim 2 in which a tag indicating a document structure of one document or a keyword indicating one important portion of one document is included in each of the documents, and the important portion of each document is extracted by the important portion extracting means by detecting one tag or one keyword from each of the documents.

4. A document retrieval system according to claim 1 in which the input sentence structural functional units are classified into a plurality of important grades by the input sentence analyzing means, and the matching degree of each particular document with the input sentence is calculated according to the important grades by the functional unit collating means on condition that the matching degree of each particular document is heightened as the number of input sentence structural functional units classified into one or more high important grades is increased in the particular document.

5. A document retrieval system according to claim 4 in which each of the document sentence structural functional units extracted by the functional unit extracting means and the input sentence structural functional units extracted by the input sentence analyzing means is a noun phrase composed of a plurality of nouns arranged in series or a verb phrase composed of a verb and a case element which is formed of a noun or a combined phrase of a noun and a preposition connected with the verb in sentence structure, and one important grade of the noun phrase is higher than that of the verb phrase.

6. A document retrieval system according to claim 1 in which the functional unit collating means comprises:

retrieval formula generating means for generating a retrieval formula expressed by a logical combination of the query words of the input sentence; and retrieval document selecting means for examining whether or not each of the documents satisfies the retrieval formula generated by the retrieval formula generating means by searching the whole documents and selecting the particular documents satisfying the retrieval formula from the documents.

7. A document retrieval system according to claim 1 in which each of the document sentence structural functional units extracted by the functional unit extracting means and the input sentence structural functional units extracted by the input sentence analyzing means is a noun phrase composed of a plurality of nouns arranged in series, a verb phrase composed of a verb and a case element which is formed of a noun or a combined phrase of a noun and a preposition connected with the verb in sentence structure or a pair of nouns connected each other through a preposition.

8. A document retrieval system according to claim 1 in which an occurrence frequency of each query word existing in the input sentence is calculated by the input sentence analyzing means, a weighting factor of each query word is calculated according to the occurrence frequency of the query word by the input sentence analyzing means, and the estimation value of each particular document indicates the sum of a plurality of products respectively obtained by multiplying one occurrence frequency of one query word and one occurrence frequency of one retrieval word agreeing with the query word together.

9. A document retrieval system, comprising:

word occurrence frequency calculating means for calculating an occurrence frequency of each of a plurality of retrieval words existing in each of a plurality of documents;

functional unit extracting means for extracting one or more document sentence structural functional units from each of the documents, each document sentence structural functional unit being composed of a plurality of words;

input sentence analyzing means for calculating an occurrence frequency of each of a plurality of query words existing in an input sentence and extracting one or more input sentence structural functional units from the input sentence, each input sentence structural functional unit being composed of a plurality of words;

functional unit collating means for collating the document sentence structural functional units of each document extracted by the functional unit extracting means with the input sentence structural functional units extracted by the input sentence analyzing means to calculate a matching degree of each document with the input sentence;

said functional unit collating means further classifying the documents into a plurality of similarity levels according to the respective matching degrees of the documents;

document rank determining means for calculating an estimation value of each of the documents from the occurrence frequencies of the retrieval words of the corresponding document calculated by the word occurrence frequency calculating means and the occurrence frequencies of the query words of the input sentence calculated by the input sentence analyzing means according to an estimation function;

said document rank determining means further ranking each of the documents classified into the same similarity level in the order of their decreasing estimation values; and outputting means for outputting a document retrieval result indicating the ranks of the documents.

* * * * *